April 22, 1941.　　　F. C. MOGER　　　2,239,464
GOPHER POISON DISPENSER
Filed Feb. 21, 1939
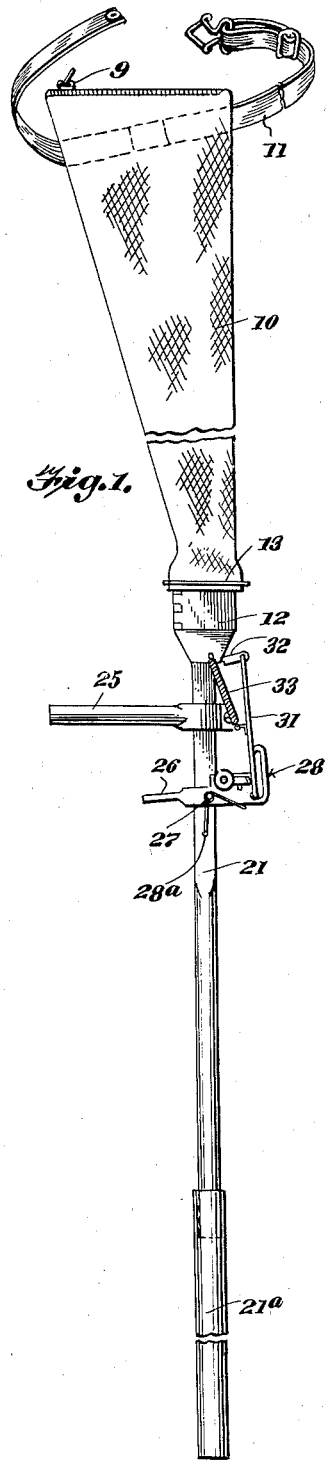
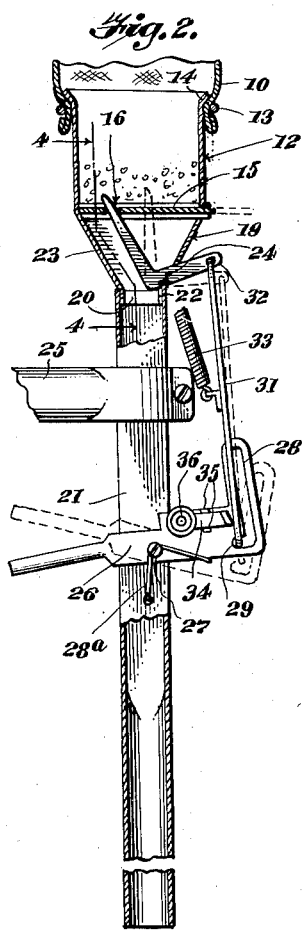
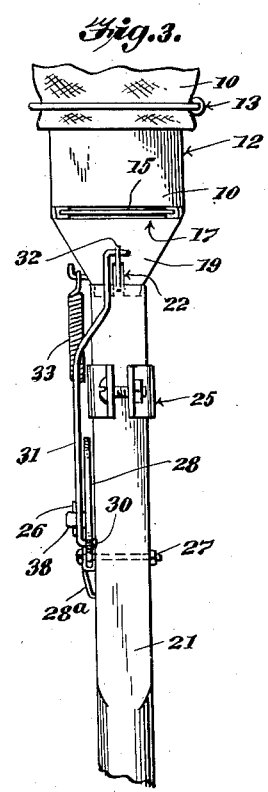
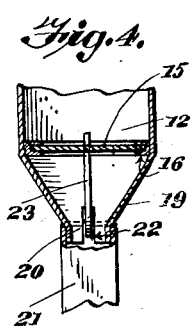
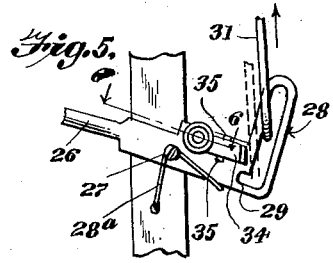
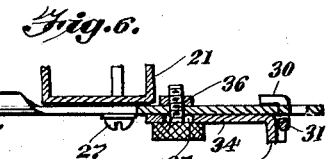
Inventor
FREDERICK C. MOGER Patented Apr. 22, 1941

2,239,464

UNITED STATES PATENT OFFICE 2,239,464

GOPHER POISON DISPENSER

Frederick C. Moger, Harrison, Mont.

Application February 21, 1939, Serial No. 257,706

6 Claims. (Cl. 221—119)

This invention relates to gopher poison dispensers, and has for one of its objects the production of a simple and efficient means for facilitating the dispensing of measured quantities of poison.

A further object of this invention is the production of a simple and efficient means for regulating the size of the measured quantities of poison discharged or dispensed from the dispenser.

Another object of this invention is the production of a dispenser which may be carried by an operator in a manner whereby the poison may be inserted in a gopher hole or deposited upon the surface of the ground without requiring the operator to stoop, or to come to a stop.

Other objects and advantages of the present invention will appear throughout the following specification and claims.

In the drawing:

Figure 1 is a side elevational view of the dispenser;

Figure 2 is a fragmentary sectional view of the dispenser, certain parts being shown in elevation;

Figure 3 is a fragmentary front elevational view of the dispenser;

Figure 4 is a vertical sectional view taken on line 4—4 of Figure 2;

Figure 5 is a side elevational view of the trigger in an operating position;

Figure 6 is a sectional view taken on line 6—6 of Figure 5.

By referring to the drawing, it will be seen that 10 designates the reservoir in the nature of a funnel-like fabric bag, which is adapted to be supported upon the body of an operator in the conventional manner by the adjustable sling strap 11. The poison material, such as treated oats and the like, is adapted to be carried within the reservoir 10, and a hookless fastener 9 may be used for closing the upper end of the reservoir 10.

A hopper 12 is suspended from the lower end of the reservoir 10 and is held in engagement therewith by means of a detachable band 13 which fits around the lower end of the reservoir and clamps the reservoir under the outwardly flared upper end 14 of the hopper 12, as shown in Figure 2. The hopper 12 is provided with a transversely sliding gate 15 which is slidable upon the tracks 16 within the hopper 12. This gate 15 is also adapted to slide through the slot 17 in the side wall 18 of the hopper 12, as shown in Figure 2. The hopper 12 is provided with a depending tapering discharge spout 19, having a depending collar 20. A discharge tube 21 fits over the collar 20, as shown in Figure 2. This collar 20 is longitudinally slotted, as at 22, for receiving a bell crank lever 23. The lever 23 is notched, as at 24, and the notch 24 overhangs the upper edge of the tube 21, in a manner to provide a fulcrum for the lever 23. The lever 23 engages the gate 15 in the manner shown in Figure 2. A suitable handle or hand-grip 25 is adjustably secured upon the tube 21. An extension tube 21a may be carried by the tube 21 to increase the length of the tube 21 when desired.

An operating trigger 26 is pivotally secured to the tube 21, as at 27, and this trigger extends under, and in substantially parallel relation with, the hand-grip 25 so as to be easily reached by the finger or fingers of the hand of the operator gripping the hand-grip 25. A spring 28a engages the trigger 26 to normally hold the trigger 26 in one position. The trigger 26 is provided with an upwardly extending slotted end 28, the slotted end having a lateral notch 29 at the bottom thereof for normally receiving the angular terminal 30 of the link rod 31. The terminal 30 is adapted to travel in the slotted end 28 in the manner shown in Figure 5, and the opposite or upper end of the link rod 31 is pivotally connected to the protruding end 32 of the lever 23 which extends beyond and through the spout 19. A tension spring 33 is connected at one end to the link rod 31 and at the other end to the spout 19 of the hopper 12.

An adjusting slide 34 is slidably mounted upon the trigger 26 between the lugs 35, and is locked in a set position by means of a set screw 36 which is carried by the trigger 26 and which passes through the slot 37 formed in the slide 34. The slide 34 is provided with an outturned flange 38 at its outer end adjacent the slotted end 28 of the trigger 26.

The operation of the device is as follows:

The desired measured amount of poison to be deposited is determined, and the slide 34 is properly adjusted to trip the link 31 so as to move the gate 15 to a desired open position and deposit the measured quantity of poison. The grip 25 is gripped by the hand of the operator and the bag or reservoir 10 is suspended from the body in the conventional manner. When the operator has reached the desired point at which the poison is to be deposited or dispensed, the trigger 26 is pulled by the finger of the operator which will move the trigger from the full line position shown in Figure 2 to the dotted line position. As the trigger is swung in this manner, the slide 34 will push the lower end of the link rod 31 to the position shown in dotted lines in Figure 2. The action of this portion of the device will be clearly understood by considering Figure 5 which illustrates the manner in which the lower end of the link rod 31 is kicked out of the offset notch 29 and into a position to slide longitudinally of the slotted end 28. It will be noted that the slide 34 is placed above and to one side of the pivot 27, thereby causing the flange 38 of the slide 34 to force the end of the link rod 31 from the notch 29 into the slotted end 28 as the trigger 26 is swung. The spring 33 will then pull the link 31 to its return position and close the gate 15, the gate 15 being opened to the desired position when the trigger 26 is first swung. It should be understood that the slide 34 may be adjusted to the desired position to regulate the swing of the bell crank lever 23 and the sliding movement of the gate 15, in this way selectively determining the measured quantities of poison material delivered from the hopper 12. The spring 28ª is adapted to return the trigger 26 to its normal position.

It is quite important that means be provided to regulate the size of the measured portions of poison to be dispensed for the reason that where one or two gophers are found in a hole, only a small dose is necessary, whereas where five or six young gophers are to be poisoned, a larger measured quantity should be inserted. The extension 21a is preferably used when inserting the poison in a hole to prevent the scattering of the poison over the ground which might be likely to poison the stock or farm animals. The poison may be inserted either in the gopher hole or may be deposited at the mouth of the hole. If the poison is to be broadcast or spread over the face of the soil, the extension 21a may be removed to facilitate the scattering of the poison grain. It should be understood that through the medium of the present device it will not be necessary for the operator to stoop in order to deposit the poison grain in the desired location.

The present device may also be found valuable for killing poisonous plants by using salt and placing the same in the hopper and dispensing the salt in measured quantities through the operation of the trigger 26, as above described.

Having described the invention, what I claim is:

1. A dispenser of the class described comprising a hopper, means for dispensing measured portions of material from said hopper, said means comprising a closure for the hopper, a trigger connected to said closure for moving the closure to an open position, means for automatically returning said closure to a closed position when said trigger is moved to a predetermined position, and adjustable means for releasing said last mentioned means for independent movement with respect to the trigger at a predetermined position of the trigger.

2. A dispenser of the class described comprising a hopper, means for dispensing measured portions of material from said hopper, said means comprising a closure for the hopper, a link for moving said closure, a trigger for moving said link, said trigger having a vertical slotted portion, the link having means movable within the slotted portion, means for releasably holding the link in a position to be moved by the trigger, and means for disconnecting the link for independent movement with respect to the trigger.

3. A dispenser of the class described comprising a hopper, means for dispensing measured portions of material from said hopper, said means comprising a closure for the hopper, a link for moving said closure, a trigger for moving said link, said trigger having a vertical slotted portion, the link having means movable within the slotted portion, said slotted portion of the trigger having a notch, said link having a portion fitting in the notch, and means carried by the trigger for moving the link out of engagement with the notch whereby the closure may move to a closed position.

4. A dispenser of the class described comprising a hopper, means for dispensing measured portions of material from said hopper, said means comprising a closure for the hopper, a link for moving said closure, a trigger for moving said link, said trigger having a vertical slotted portion, the link having means movable within the slotted portion, said slotted portion of the trigger having a notch, said link having a portion fitting in the notch, means carried by the trigger for moving the link out of engagement with the notch whereby the closure may move to a closed position, and spring means for moving the closure to a closed position.

5. A dispenser of the class described comprising a hopper, means for dispensing measured portions of material from said hopper, said means comprising a closure for the hopper, a link for moving said closure, a trigger for moving said link, said trigger having a vertical slotted portion, the link having means movable within the slotted portion, said slotted portion of the trigger having a notch, said link having a portion fitting in the notch, and an adjustable slide carried by the trigger for moving the link out of engagement with the notch whereby the closure may move to a closed position and dispense selected quantities of portions of material from the hopper.

6. A dispenser of the class described comprising a hopper, a dispensing tube carried thereby, a closure gate within the hopper, a lever engaging said gate and having a notch fitting over the upper end of the tube to provide a fulcrum for said lever, and trigger means for actuating said lever.

FREDERICK C. MOGER.